United States Patent [19]

Nagata et al.

[11] Patent Number: 5,130,822
[45] Date of Patent: Jul. 14, 1992

[54] METHOD AND APPARATUS FOR CORRECTING AN IMAGE SIGNAL

[75] Inventors: Tatsuya Nagata, Ibaraki; Michihiro Watanabe, Tsuchiura; Takehiko Yamada; Eiichi Hara, both of Chigasaki, all of Japan

[73] Assignee: Hitachi, Ltd., Tokyo, Japan

[21] Appl. No.: 481,626

[22] Filed: Feb. 20, 1990

[30] Foreign Application Priority Data

Mar. 10, 1989 [JP] Japan .................... 1-58456

[51] Int. Cl.$^5$ ............................................. H04N 1/40
[52] U.S. Cl. ....................................... 358/461; 358/463
[58] Field of Search ............ 358/446, 447, 461, 463, 358/464, 465, 466, 467, 475

[56] References Cited

U.S. PATENT DOCUMENTS

| 3,723,649 | 3/1973 | Pitegoff et al. | 358/463 |
| 4,525,741 | 6/1985 | Chahal et al. | 358/446 |
| 4,578,711 | 3/1986 | White et al. | 358/464 |
| 4,961,117 | 10/1990 | Rumley | 358/461 |

FOREIGN PATENT DOCUMENTS

| 6094576 | 10/1983 | Japan . |
| 60-102063 | 6/1985 | Japan . |
| 61-12175 | 1/1986 | Japan . |
| 63-294177 | 11/1988 | Japan . |

Primary Examiner—Edward L. Coles, Sr.
Assistant Examiner—Jerome Grant, II
Attorney, Agent, or Firm—Antonelli, Terry, Stout & Kraus

[57] ABSTRACT

A digital signal is provided by correcting image signal distortions contained in an image signal outputted from an elongated direct contact type image sensor in an image reader such as a facsimile device, which image sensor reads patterns on a document in contact with the document. The image signal distortions of the sensor output are so-called shading distortions due to sensitivity distribution of sensor elements or distribution of light from light sources onto the document. Signal distortions are corrected from both a white signal outputted from the sensor when a white document is read and a black signal outputted when a black document is read. The white signal and the black signal are stored and reproduced to generate a reference signal which is obtained by dividing the voltage range across both the signals at a predetermined ratio. The digital signal is obtained by comparing the sensor output with the reference signal. If necessary, a pseudo-black signal may be produced by dividing the voltage of the white signal.

11 Claims, 8 Drawing Sheets

F I G. 1
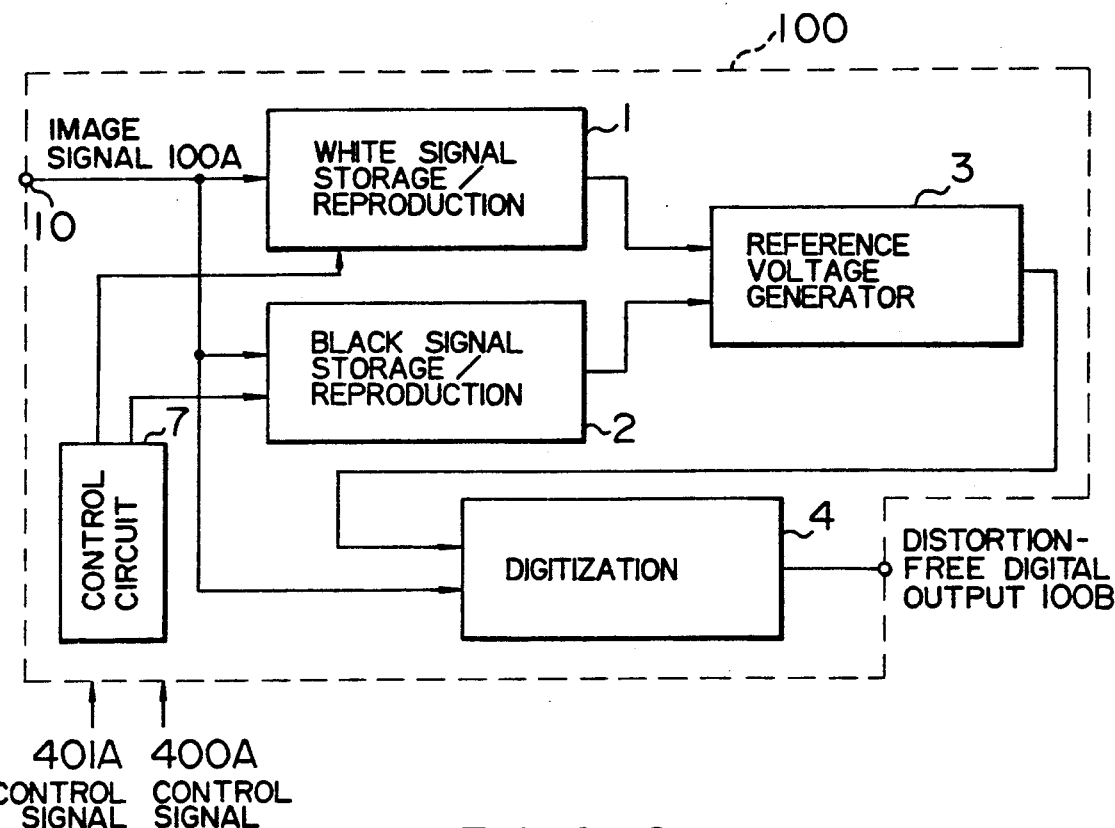
F I G. 2
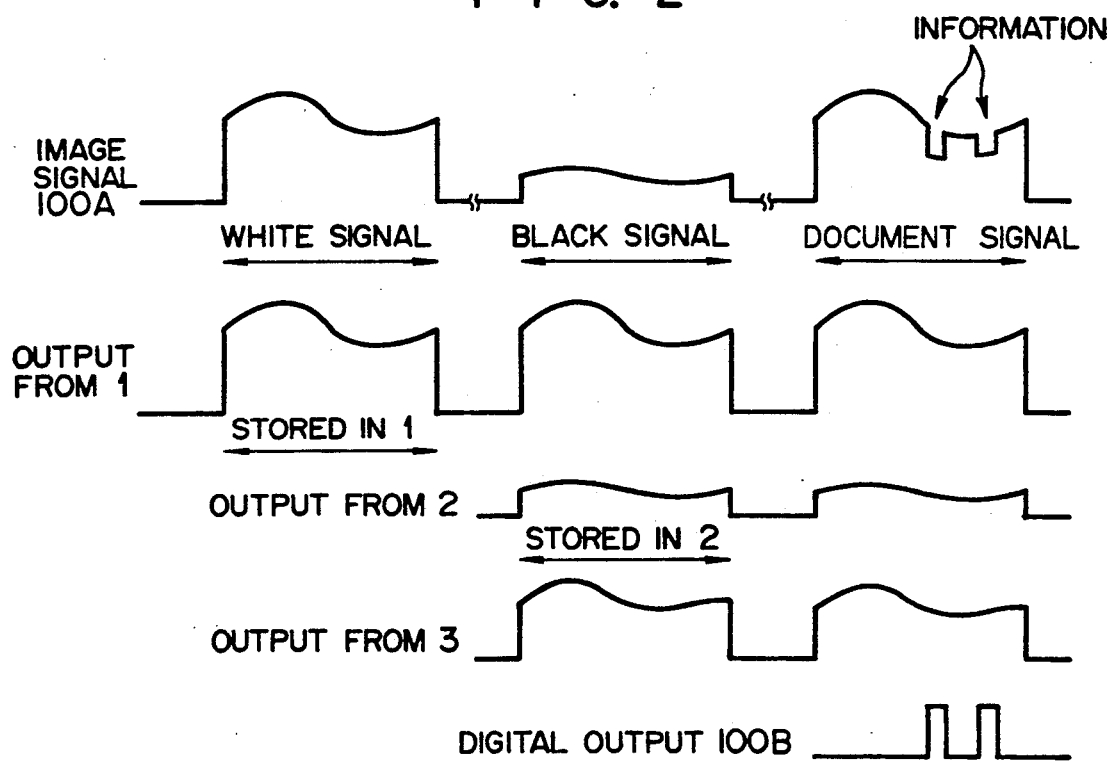

F I G. 13
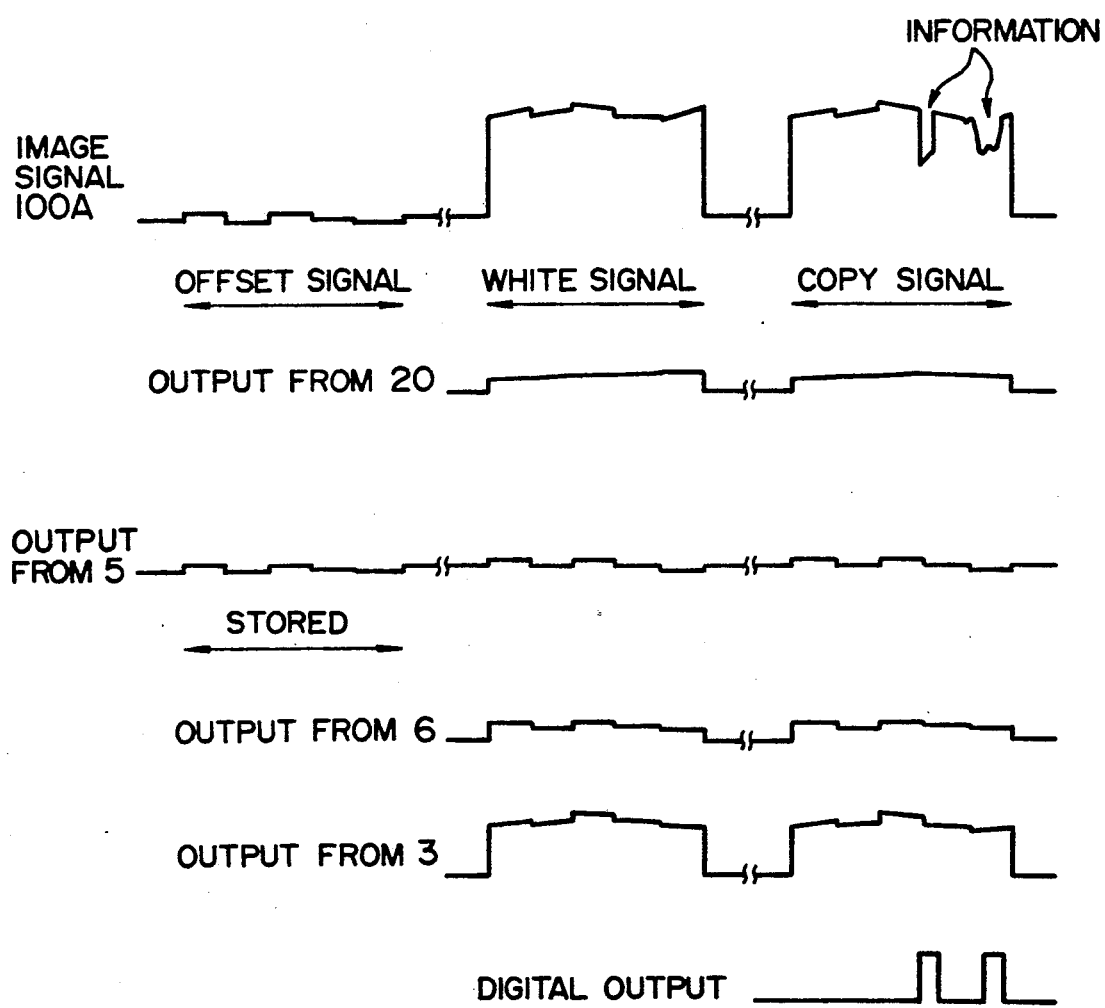

METHOD AND APPARATUS FOR CORRECTING AN IMAGE SIGNAL

BACKGROUND OF THE INVENTION

This invention relates to a method and apparatus preferably used in a facsimile system or an image reader system so as to correct both a white document signal distortion and a black document signal distortion included in an image signal generated from an image reader reading a pattern on a document. More particularly, this invention relates to an image signal correcting method and apparatus suitable for reducing the size and scale of the system of the kind described above.

A conventional apparatus for correcting an image signal is disclosed in, for example, JP-A-61-12175. The disclosed apparatus comprises means for A/D converting an image signal generated from an image sensor, means for storing a dark signal output of the image sensor, means for subtracting the dark signal output from a bright signal output of the image sensor thereby storing a sensitivity component, and means for processing the sensitivity component together with the signal component obtained by subtracting the dark signal output from the image output signal of the image sensor, whereby the image output signal of the sensor having both a dark signal distortion and a bright signal distortion can be corrected to be freed from such distortions.

In the disclosed apparatus, the image signal in the form of the digital signal is processed for the purpose of correction of the image signal. Therefore, the conventional apparatus requires additional processing means besides the means for storing the dark signal output of the image sensor and the means for storing the sensitivity component. That is, a memory having a function required for executing high-speed processing is additionally provided. Thus, a memory having a large memory capacity, for example, a 1-megabit memory is additionally required, and it has been difficult to reduce the scale of the apparatus, to integrate the apparatus into an integrated circuit and to reduce the cost of the apparatus.

Further, when the image sensor is brought into direct contact with a document to read an image of a pattern on the document, part of light from light sources may impinge on the sensor itself thereby causing a shading distortion in the image signal. Such an undesirable phenomenon was not taken into consideration in the apparatus described above.

SUMMARY OF THE INVENTION

It is an object of the present invention to provide a method capable of removing a shading distortion in an image signal by means of a circuit of a small scale suitable to be integrated into an LSI, and also to provide an apparatus integrated into an integrated circuit suitable for carrying out the image signal correcting method.

Another object of the present invention is to provide an image signal correcting method and apparatus which can generate a distortion-free digital image signal even when an image sensor of direct contact type is used for reading a document image.

An image sensor of the direct contact type is advantageously used for reducing the size and scale of a facsimile system. It is necessary to correct distortions of both a white signal which is an image signal generated from the image sensor reading a white document and a black signal which is an image signal generated from the image sensor reading a black document. This is because the image sensor of the direct contact type generates a black signal of non-zero level due to the inherent restriction owing to the manner of image reading.

A one-dimensional image sensor commonly used in a facsimile system has, for example, a structure as shown in FIG. 3 which is a perspective view of the sensor. Referring to FIG. 3, opaque individual electrodes 304, transparent electrodes 303 and a common electrode 302 are electrically connected to photoelectric conversion films 301 on a transparent substrate 310, and the photoelectric conversion films 301 are linearly disposed in a relation electrically isolated from each other on the substrate 310. In the case of an image sensor commonly used in a facsimile system classified as the group 3 (G3) according to the International Standards, about 2,000 photoelectric conversion elements for example are arranged at a density of eight elements per mm, and the output signals of the individual photoelectric conversion elements are derived from respective output terminals 306. In an optical system commonly used in the facsimile system, light reflected from a document to be read is focused on the photoelectric conversion films 301. When such an optical system is used, a white signal appears as a photoelectric conversion output for a white document, while a black signal of normally zero level appears as a photoelectric conversion output for a black document.

On the other hand, in the case of the image sensor of the direct contact type, optical paths and photoelectric conversion outputs are different from those of the conventional image sensor although the structure of the photoelectric conversion elements may be the same. FIG. 4 is a sectional view of the image sensor of the direct contact type. Referring to FIG. 4, a protective film 305 is formed on the photoelectric conversion films 301. A nonglare conductive film 307 is provided on the protective film 305 so as to stabilize image reading, and a platen roller 309 is used to directly press a document 308 toward and onto the photoelectric conversion films 301. Light from dispersed irradiating light sources (not shown) is directed toward the other surface of the transparent substrate 310 remote from the surface on which the photoelectric conversion films 301 are formed. The light from the light sources is incident on the image sensor along representative optical paths 311a, 311b and 311c as shown in FIG. 4. The light directed along the optical path 311a passes through the transparent substrate 310 to irradiate the document 308, and the light reflected from the document 308 with the intensity corresponding to the factor of reflection or optical density at the surface of the document 308 passes through the transparent electrode 303 and is then incident on the photoelectric conversion films 301 to be subject to photoelectric conversion. Thus, when the document 308 is white, and such a document 308 is irradiated with the light directed along the optical path 311a, a white signal is generated from the image sensor as a result of the photoelectric conversion. The light directed along the optical path 311b is intercepted by the opaque discrete electrodes 304 and does not participate in the photoelectric conversion. Further, the light directed along the optical path 311c is directly incident on the photoelectric conversion films 301 and is subjected to photoelectric conversion regardless of the presence of the document 308. Thus, a black signal is generated even when the document 308 is black. Also, because the light sources are dispersed, the quantity of light directed along the optical path 311c is not always constant at all the positions on the image sensor.

Such a black signal which is not dependent upon whether the document 308 is white or black provides a noise component of the image signal. FIG. 5 shows a practical example of a shading distortion occurring in one line portion of the image signal, and the white signal $V_W$ and the black signal $V_B$ have respective waveforms as shown in FIG. 5. Both the white signal $V_W$ and the black signal $V_B$ include distortions providing the source of shading attributable to non-uniform illuminances of light directed from the light sources. In FIG. 5, the symbol $V_G$ designates a gray signal generated from the image sensor when a uniform gray document is irradiated. According to a common practice widely used for correcting such a shading distortion occurring in the image signal, a predetermined constant black level $V_{BO}$ is set for the black signal $V_B$, and the voltage range between this predetermined black level $V_{BO}$ and the white signal $V_W$ is suitably divided so as to produce a reference signal $V_{GO}$ which is different from the actual gray signal $V_G$. Thus, even when the gray signal $V_G$ corresponds to the uniform gray document, the signal level higher than the reference signal $V_{GO}$ is determined to be white, while the signal level lower than the reference signal $V_{GO}$ is determined to be black, thereby greatly degrading the quality of the image signal. Therefore, in the case of the image sensor of the direct contact type which generates the black signal as its image signal output when it reads a black document under irradiation with light, it is necessary to correct the shading distortion for both the white signal and the black signal.

According to a preferred embodiment of the present invention, a white signal storage/reproduction circuit for storing and reproducing an image signal of a white document stores and reproduces an image signal obtained by previously reading a reference white document by an image sensor of direct contact type. The white signal thus obtained includes an image signal distortion or a so-called shading distortion attributable to a sensitivity distribution of the image sensor and a distribution of the intensity of light emitted from light sources and transmitted through an irradiating optical system. A black signal storage/reproduction circuit for storing and reproducing an image signal of a black document stores and reproduces an image signal obtained by previously reading a reference black document by the image sensor.

In the image sensor of the direct contact type, the black signal generated by reading a black document is produced by direct incidence of document irradiating light on the photoelectric conversion elements and also by incidence of light scattered from other films of the image sensor and surroundings except from the document. Thus, the black signal includes a shading distortion attributable to a sensitivity distribution of the image sensor itself and the distance from the irradiating light sources. On the other hand, the white signal generated from the image sensor of the direct contact type when a white document is read by the image sensor is the sum of the black signal and the sensor output signal produced by photoelectric conversion of light reflected from the document.

A reproduced signal waveform is provided on the basis of the white signal reproduced from the white signal storage/reproduction circuit and the black signal reproduced from the black signal storage/reproduction circuit. This reproduced signal waveform is obtained by dividing the voltage range between the white signal and the black signal according to a predetermined ratio and thus corresponds to a signal obtained by reading a document having a predetermined intermediate factor of reflection (a gray document) by the image sensor. This reproduced signal waveform is used as a reference voltage, and an image output signal of the image sensor reading a document is compared with this reference voltage, so that a digital output signal dependent on the result of comparison is generated. Therefore, the image signal including a shading distortion is corrected on the basis of the predetermined document density, so that a distortion-free digital image output signal can be produced.

The black signal generated from the image sensor of the direct contact type has generally a waveform corresponding to a voltage-divided equivalent of the white signal, because the image sensor receives part of light transmitted from the irradiating light sources. Therefore, when the white signal is voltage divided to be turned into a predetermined voltage level by a pseudo-black signal generator circuit employed in another embodiment of the present invention, the waveform of a pseudo-black signal generated from the pseudo-black signal generator circuit is analogous to that of the black signal actually generated by reading the black document by the image sensor. The reproduced white signal and the pseudo-black signal are subjected to voltage division in a reference voltage generator circuit to provide a reproduced signal waveform. This reproduced signal waveform is used as a reference voltage to be compared in a digitization circuit with an image signal generated by reading a document by the image sensor, and a digital output signal dependent upon the result of comparison is generated from the digitization circuit. This digital image signal is almost free from shading distortions included in both the white signal and the black signal, which is approximated by the pseudo-black signal.

Because of the necessity for reading a document having a sheet width of the size A4 or B4, the width of the image sensor of the direct contact type is required to be substantially as large as that of the sheet of the size A4 or B4. A CCD sensor formed on a silicon wafer has a limitation in its size so as to read a document having such a large area. Therefore, an array of a plurality of CCD sensor chips or a photo sensor having photoelectric conversion films capable of forming a large area such as hydrogenated amorphous silicon and cadmium sulfide is commonly used for that purpose. In the case of the former, the individual CCD sensor chips in the array have respectively different sensitivities and offsets thereby giving rise to a stepped shading distortion. On the other hand, in the case of the latter, a plurality of IC's for driving purpose are most frequently employed. In such a system too, the individual driving IC's generate different outputs offset thereby giving rise to a stepped shading distortion. Such a stepped shading distortion appears several times or several ten times during corresponding to the number of IS's document reading in one scanning cycle. The image sensor generates its output signal corresponding to the reflection factor of a document as described already. Thus, the above problem can be dealt with by producing the pseudo-black signal by dividing the voltage of the white signal in the pseudo-black signal generator circuit. In still another embodiment of the present invention, the stepped offset signal generated from the image sensor when a document is not irradiated with light transmitted from the light sources is reproduced in an offset signal storage/reproduction circuit, and this offset signal is added in an adder circuit to the pseudo-black signal. The resultant output signal of the adder circuit and the white signal are applied to the reference voltage generator circuit to be subjected to voltage division so as to provide a reproduced signal waveform. This reproduced signal waveform is used as a reference voltage which is compared with an image signal generated by reading a document by the image sensor, and a digital output signal dependent upon the result of comparison is generated from the digitization circuit. This digital image output signal is almost freed from the shading distortions included in both the white signal and the black signal.

The circuits used for image signal correction have small circuit scales suitable to be integrated into an integrated circuit.

BRIEF DESCRIPTION OF THE DRAWINGS

FIG. 1 is a block diagram showing the structure of a preferred embodiment of the image signal correcting apparatus according to the present invention.

FIG. 2 is a waveform diagram for illustrating the operation of the embodiment shown in FIG. 1.

FIG. 13 is a waveform diagram for illustrating the operation of the embodiment shown in FIG. 12.

DESCRIPTION OF THE PREFERRED EMBODIMENTS

Figure 6:
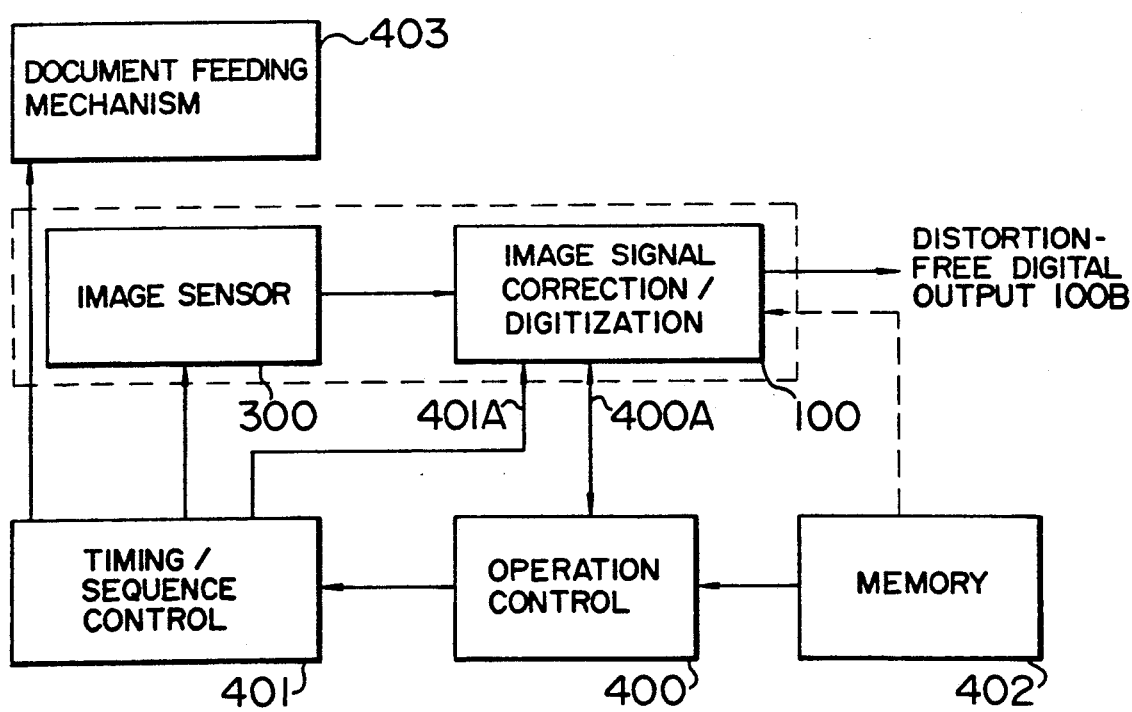
FIG. 6 is a block diagram showing the structure of a document image reading system including the apparatus of the present invention.
Figure 7:
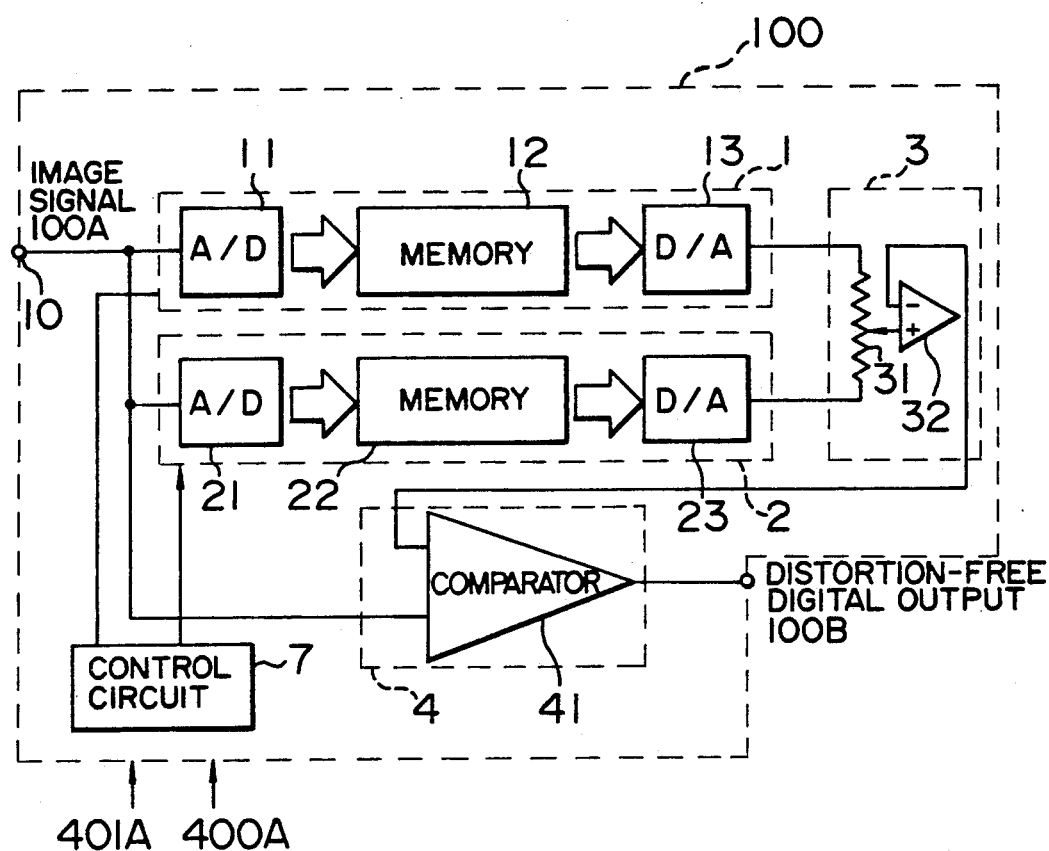
FIG. 7 is a block diagram showing in further detail the structure of the embodiment shown in FIG. 1.

A preferred embodiment of the image signal correcting apparatus according to the present invention will now be described in detail with reference to FIGS. 1, 2, 6 and 7. FIG. 1 is a block diagram showing the general structure of the first embodiment, FIG. 2 is a waveform diagram for illustrating the operation of the first embodiment, and FIG. 7 is a block diagram showing in further detail the structure of the first embodiment. FIG. 6 is a block diagram showing the location of the first embodiment in a document image reading system such as that in a facsimile system.

In a document image reading system commonly used in a facsimile system as shown in FIG. 6, a document feeding mechanism 403 feeds a document in synchronous relation with image reading timing of an image sensor 300. An image output signal generated from the image sensor 300 is applied to an image signal correction and digitization circuit 100 so as to remove a shading distortion attributable to a sensitivity distribution of the image sensor 300 and non-uniform luminances of light transmitted from light sources irradiating the document, and a digital output signal 100B free from the shading distortion is generated from the correction/digitization circuit 100. For the purpose of this shading correction, it is necessary to store the date of shading distortion dependent on the image reading system, and, on the basis of the stored data of shading distortion, to correct the distortion of the image signal read by the image sensor 300. Therefore, it is necessary to provide a memory circuit 402 which can be referenced from the image signal correction/digitization circuit 100, or it may be necessary to provide a memory circuit built in the image signal correction/digitization circuit 100 itself. A timing and sequence control unit 401 and an operation control unit 400 have functions for controlling synchronous operations and operating conditions of the image sensor 300, the document feeding mechanism 403 and the image signal correction/digitization circuit 100. More precisely, the timing/sequence control unit 401 includes many hardware parts in view of the requirement for high-speed operation, and the operation control unit 400 is commonly in the form of a CPU which uses a software programmed for controlling the components 100, 401 and 402 operating at a relatively low speed. The timing/sequence control unit 401 and the operation control unit 400 generated control signals 401A and 400A respectively for controlling the image signal correction/digitization circuit 100.

In the form of the image signal correction/ digitization circuit 100 shown in FIG. 1, a distortion free digital output signal 100B is generated from the circuit 100 when an image signal 100A including a distortion is applied as an input. Referring to FIG. 1, the first embodiment comprises a white signal storage and reproduction circuit 1 for storing and reproducing a white signal obtained by reading a reference white document so as to use this white signal as a white reference level for the purpose of shading correction, a black signal storage and reproduction circuit 2 for storing and reproducing a black signal obtained by reading a reference black document so as to use this black signal as a black reference level for the purpose of shading correction, a reference voltage generator circuit 3 for generating a reference signal waveform obtained by dividing the voltage range between the reproduced white signal and the reproduced black signal according to a predetermined ratio, a digitization circuit 4 comparing the image signal 100A with the output signal of the reference voltage generator circuit 3 thereby generating the distortion-free digital output signal 100B, and a control circuit 7 controlling the operation sequence and timing of the circuits described above.

In the image signal correction/digitization circuit 100 having the structure described with reference to FIG. 1, the white signal providing the white reference level is applied from an image signal input source 10 and stored in the white signal storage/ reproduction circuit 1. Then, the black signal providing the black reference level is applied from the same image signal input source 10 and stored in the black signal storage/reproduction circuit 2. As shown in FIG. 2, each of the white signal and the black signal includes a shading distortion attributable to a sensitivity distribution of the image sensor and a distribution in the illuminances of light from the light sources irradiating the document.

The white signal storage/reproduction circuit 1 and the black signal storage/reproduction circuit 2 have the same structure as shown in FIG. 7. The image signal 100A, which is an analog signal applied from the image signal input source 10, is converted into digital signals by respective A/D converters 11 and 21. The digital output signals of the A/D converters 11 and 21 are stored in memory circuits 12 and 22, and the output signals of the memory circuits 12 and 22 are then converted into analog signals by D/A converters 13 and 23 respectively. Thus, the white signal and the black signal are reproduced as analog signals as shown in FIG. 2. The white signal and the black signal thus reproduced are applied to the reference voltage generator circuit 3 which includes a resistor 31 and a buffer amplifier 32 as shown in FIG. 7. In the reference voltage generator circuit 3, the voltages applied to the both ends of the resistor 31 are divided by the combination of the resistor 31 and the buffer amplifier 32, and a reference voltage providing a basic reference level as shown in FIG. 2 is generated from the reference voltage generator circuit 3. It will be seen in FIG. 2 that this reference voltage has a reproduced waveform obtained by dividing the voltage range between the black signal and the white signal according to a predetermined ratio and corresponds to an image signal produced when a document having a predetermined intermediate factor of surface reflection is read by the image sensor. The document image signal 100A produced by reading a document by the image sensor is compared by a comparator 41 in the digitization circuit 4 with the thus produced reference voltage, so as to convert the document image signal 100A into the digital signal dependent on the result of comparison in the comparator 41. Therefore, the distortion-free digital output signal 100B is produced from the image signal 100A including a shading distortion by comparing the image signal 100A with the reference voltage produced on the basis of a predetermined optical density of the document. The operation sequence described above is controlled by the control circuit 7 incorporated in the image signal correction/digitization circuit 100 to which the control signals 401A and 400A are externally applied.

The first embodiment described above is advantageous in that an analog image signal, in which both a white signal and a black signal have a shading distortion, can be accurately corrected and converted into a distortion-free digital signal in spite of the fact that the correction/digitization circuit has a small circuit scale. Because the shading distortion can be corrected by the correction/digitization circuit having the small circuit scale, the present invention can provide an inexpensive image signal correcting apparatus suitable to be integrated into an LSI.

Figure 8:
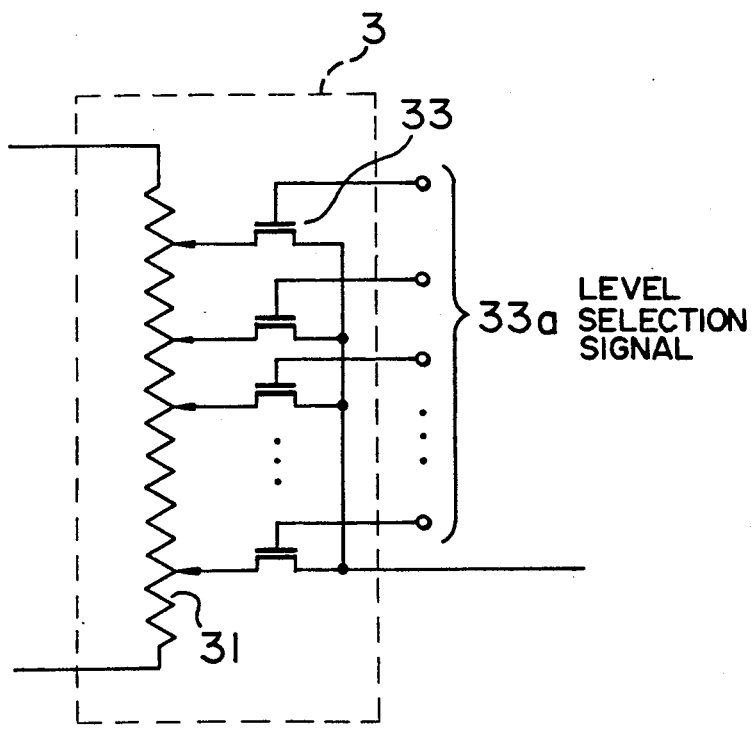
FIG. 8 is a circuit diagram showing the structure of one form of the reference voltage generator circuit shown in FIG. 7.

The A/D converters 11 and 21 shown in FIG. 7 may be combined into a single A/D converter which handles both the white signal and the black signal. This arrangement can further reduce the circuit scale. The reference signal generator circuit 3 employed in the first embodiment includes the single resistor 31 and the single buffer amplifier 32 so that the distortion-free digital output signal 100B in the form of the binary-coded white and black levels is produced as the output of the image signal correction/digitization circuit 100. However, the reference voltage generator circuit 3 may be modified into a form as shown in FIG. 8. Referring to FIG. 8, the resistor 31, to both ends of which the white signal and the black signal respectively are applied, is combined with a plurality of switches 33 so that a plurality of level selection signals 33a can be derived from a plurality of different intermediate positions respectively of the resistor 31. According to the modification shown in FIG. 8, reference voltages having a plurality of different levels provided by the plural level selection signals 33a can be selectively derived from the image output signals of the photoelectric conversion elements of the image sensor. Therefore, a distortion-free digital output signal having a half tone based on a tone gradient with area such as dither method can be obtained.

Figure 9:
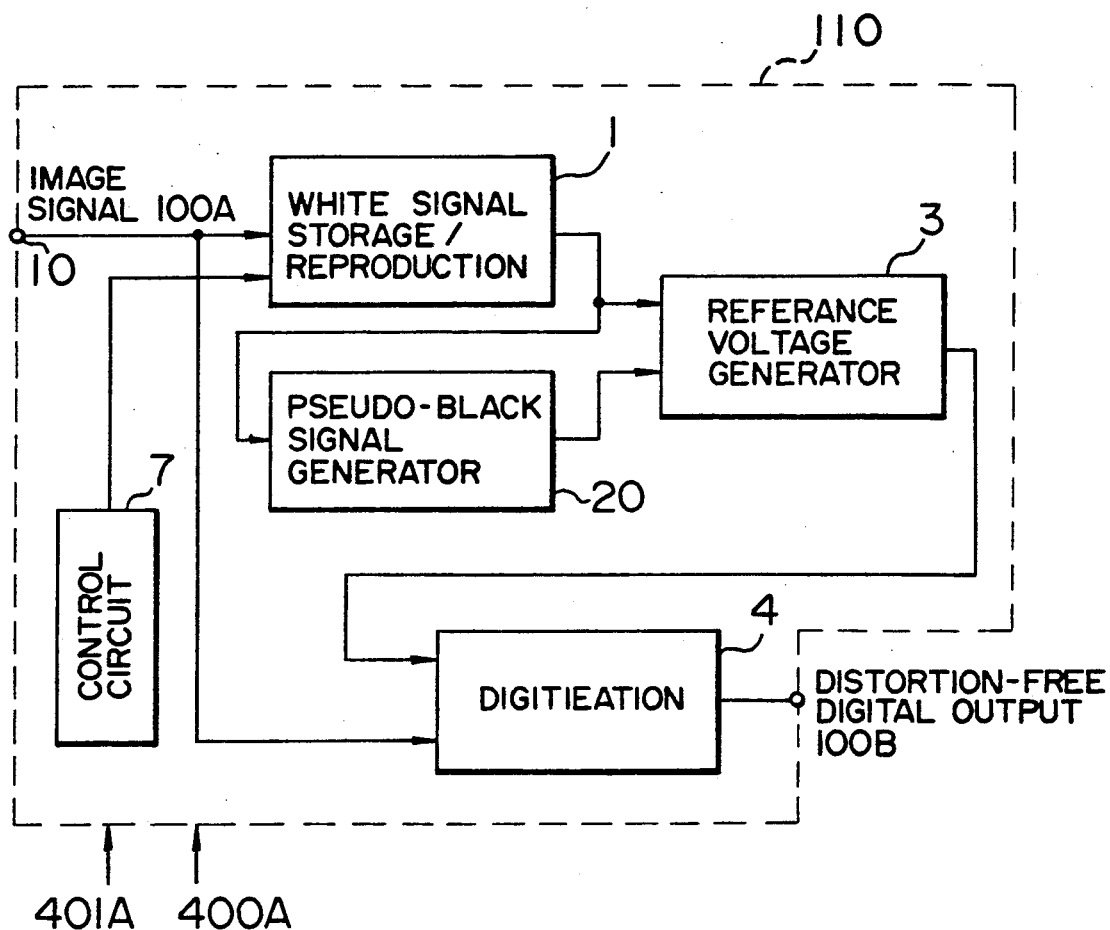
FIG. 9 is a block diagram showing the structure of another embodiment of the present invention.
Figure 10:
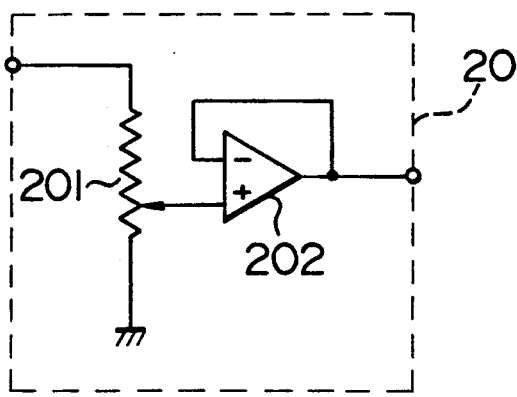
FIG. 10 is a circuit diagram showing the structure of one form of the pseudo-black signal generator circuit shown by FIG. 9.

Another preferred embodiment of the present invention will now be described with reference to FIGS. 9 and 10. FIG. 9 is a block diagram showing the structure of the second embodiment of the image signal correcting apparatus of the present invention. In FIG. 9, the image signal correcting apparatus is generally designated by the reference numeral 110. This second embodiment differs from the first embodiment in that the black signal storage/reproduction circuit 2 shown in FIG. 1 is replaced by a pseudo-black signal generation circuit 20. The remaining components shown in FIG. 9 are the same as those shown in FIG. 1, and any detailed description of such components is unnecessary.

Figure 3:
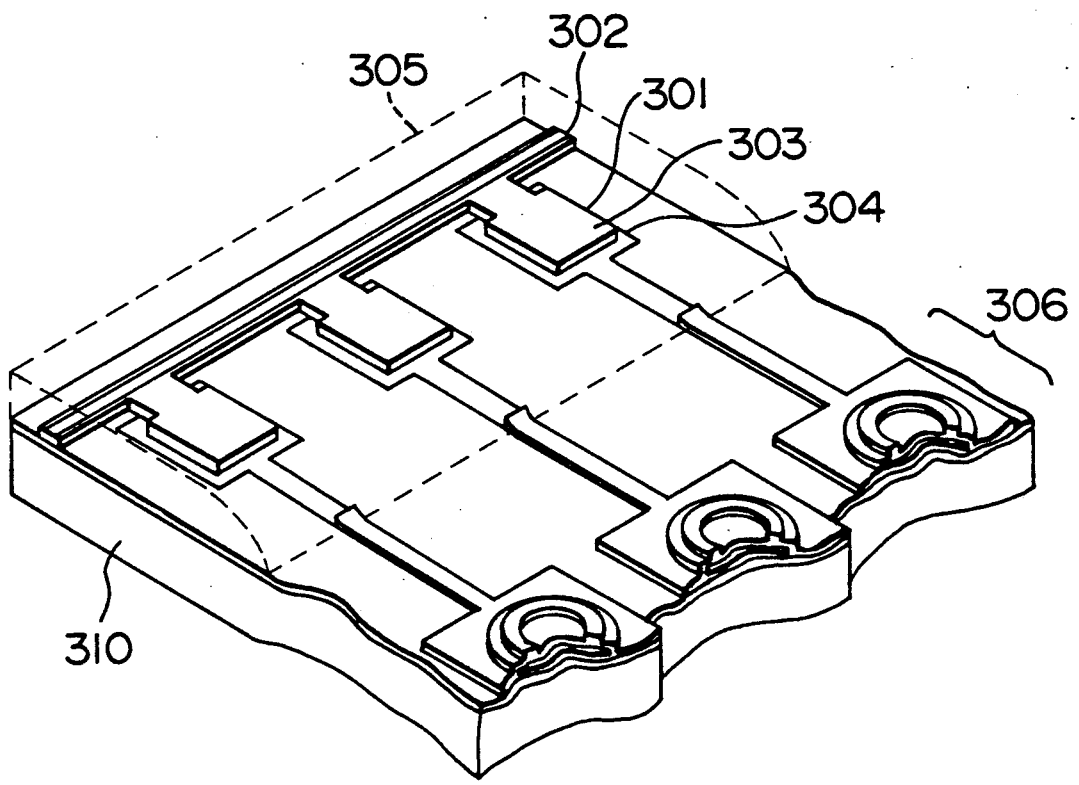
FIG. 3 is a perspective view of an image sensor having concern with the present invention.
Figure 4:
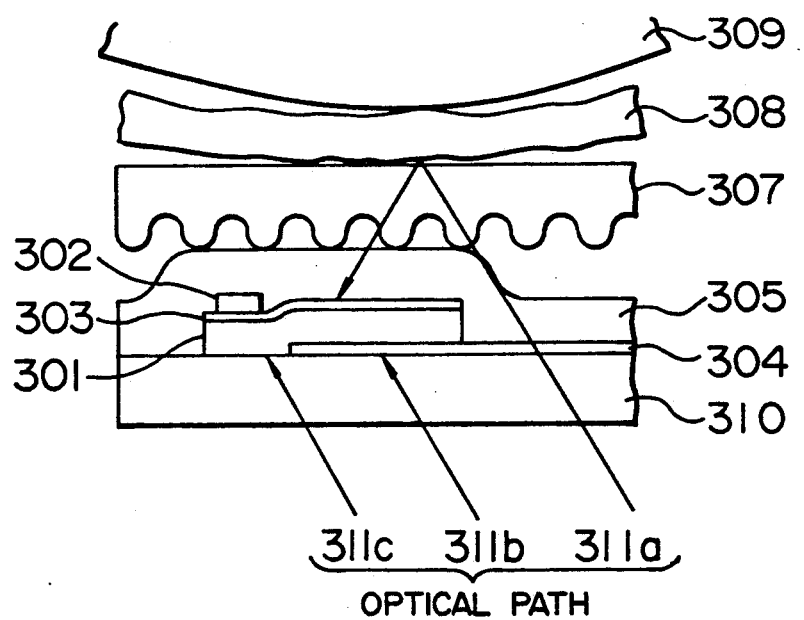
FIG. 4 is a sectional view of the sensor shown in FIG. 3.
Figure 5:
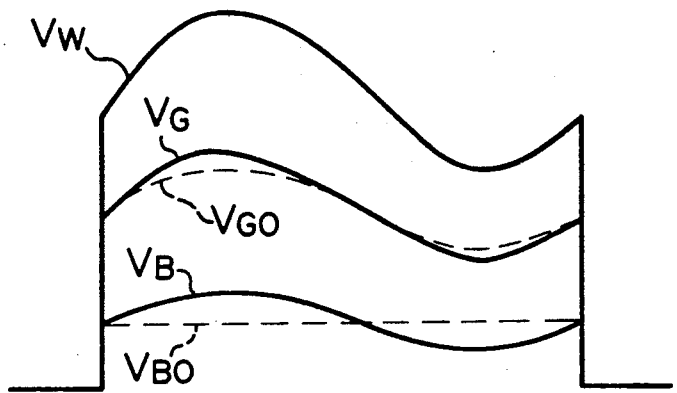
FIG. 5 is a waveform diagram for illustrating the operation of the sensor shown in FIG. 4.

Referring to FIG. 9, an image signal 100A including a shading distortion is applied from the image signal input source 10, and a white signal providing a white reference signal is stored in the white signal storage/reproduction circuit 1. The while signal reproduced from the white signal storage/reproduction circuit 1 is applied to the pseudo-black signal generator circuit 20 which generates a pseudo-black signal by dividing the voltage of the reproduced white signal. As shown in FIG. 10, the pseudo-black signal generator circuit 20 includes a resistor 201 and a buffer amplifier 202. The white signal and the pseudo-black signal providing white and black reference signals respectively are applied to the reference voltage generator circuit 3 in which the voltage of the white signal relative to that of the pseudo-black signal is divided to appear as a reference voltage. This reference voltage and the distorted image signal 100A are applied to the digitization circuit 4, and a pseudo distortion-free digital output signal 100B is generated from the digitization circuit 4. In this case, the individual output signals of the circuits 1, 20 and 3 have waveforms similar to those shown in FIG. 2, and it will be seen that the output signal of the circuit 2 shown in FIG. 2 is merely replaced by the output signal of the circuit 20 shown in FIG. 9. The reason why the signal obtained by dividing the voltage of the white signal can be used as the pseudo-black signal without storing and reproducing the black signal is that the waveform of the black signal is analogous to that of the white signal in the case of the image sensor of the direct contact type. That is, as shown in FIG. 4 which is the sectional view of the image sensor of the direct contact type, the white signal has the level proportional to the intensity of light radiated from the light sources, because, after the light from the light sources reaches the document, the reflected light is incident on the photoelectric conversion films. Similarly, the black signal is principally produced by direct incidence of the light from the light sources on part of the photoelectric conversion films, and its level is also proportional to the intensity of the light radiated from the light sources. Therefore, the level of the black signal is proportional to that of the white signal, and, when a distortion occurs in the white signal due to a distribution of the intensity of light radiated from the light sources, a proportional and analogous distortion occurs also in the black signal. Thus, even when the white signal reproduced from the white signal storage/ reproduction circuit 1 is voltage-divided to produce the pseudo-black signal, and a shading distortion is corrected on the basis of the white and pseudo-black signals, a negligible correction error merely results so that the shading distortion can be effectively corrected.

Figure 11:
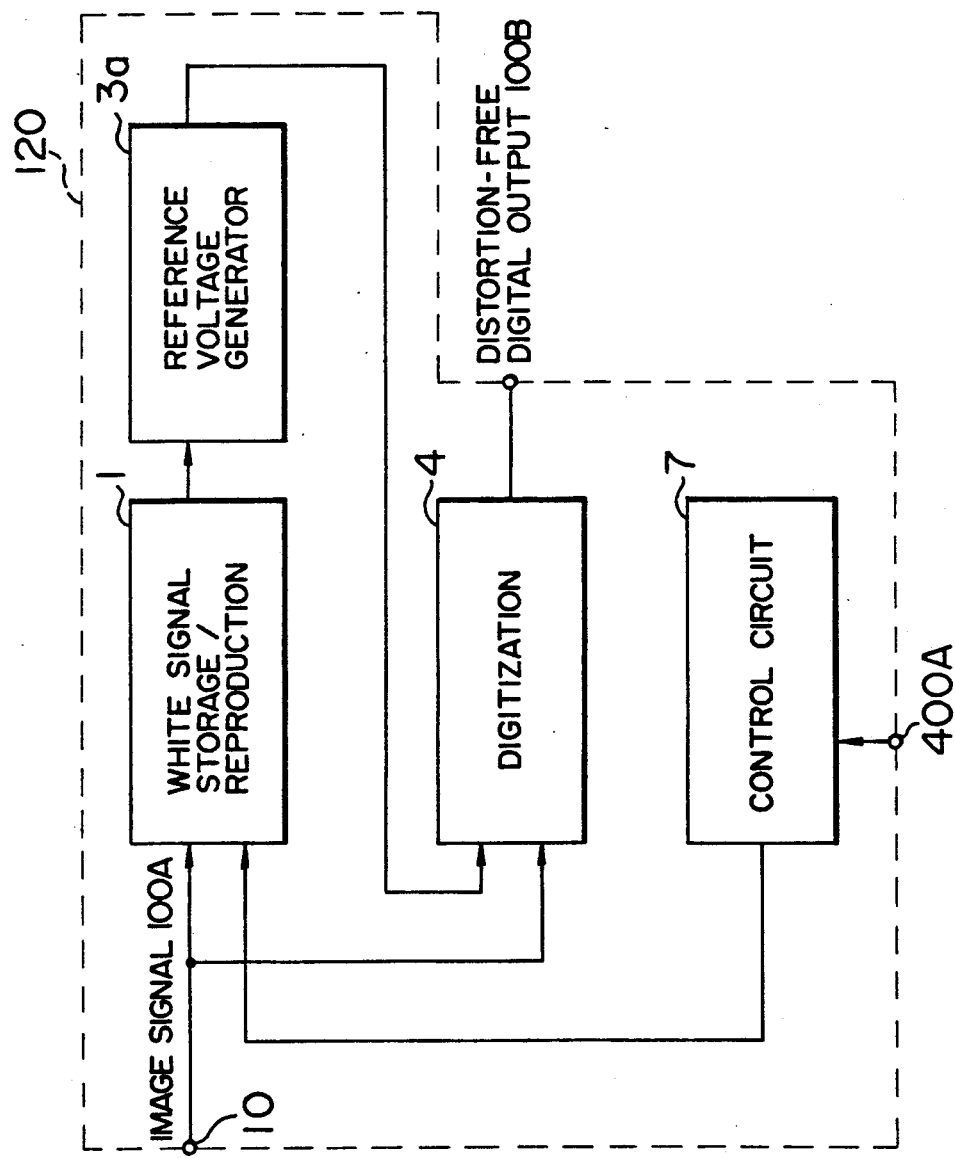
FIG. 11 is a block diagram showing the structure of a modification of the embodiment shown in FIG. 9.

The second embodiment described above is also advantageous in that an analog image signal, in which both a white signal and a black signal have a shading distortion, can be substantially accurately corrected and converted into a distortion-free digital signal in spite of the fact that the correction/digitization circuit has a small circuit scale. Therefore, the present invention provides an image signal correction apparatus which is inexpensive and suitable to be integrated into an LSI. In this second embodiment, the pseudo-black signal generator circuit 20 and the reference voltage generator circuit 3 are separately provided. Therefore, when the reference voltage generator circuit 3 of the structure described already with reference to FIG. 8 is utilized for the purpose of selection of one of a plurality of half tones, the correction/digitization circuit shown in FIG. 9 can be easily applied to any one of various kinds of image sensors of the direct contact type producing pseudo-black signals having different levels. This is because the level of the pseudo-black signal can be independently changed even when the level of the reference voltage is fixed. Further, because the pseudo-black signal and the reference voltage are produced in a relation proportional to the white signal, the pseudo-black signal generator circuit 20 shown in FIG. 9 may be eliminated, and the image signal correcting apparatus 110 may be modified into a form as shown in FIG. 11. In the modified image signal correcting apparatus 120 shown in FIG. 11, a reference voltage generator circuit 3a having an additional function of a function generator is used to further simplify the structure.

Figure 12:
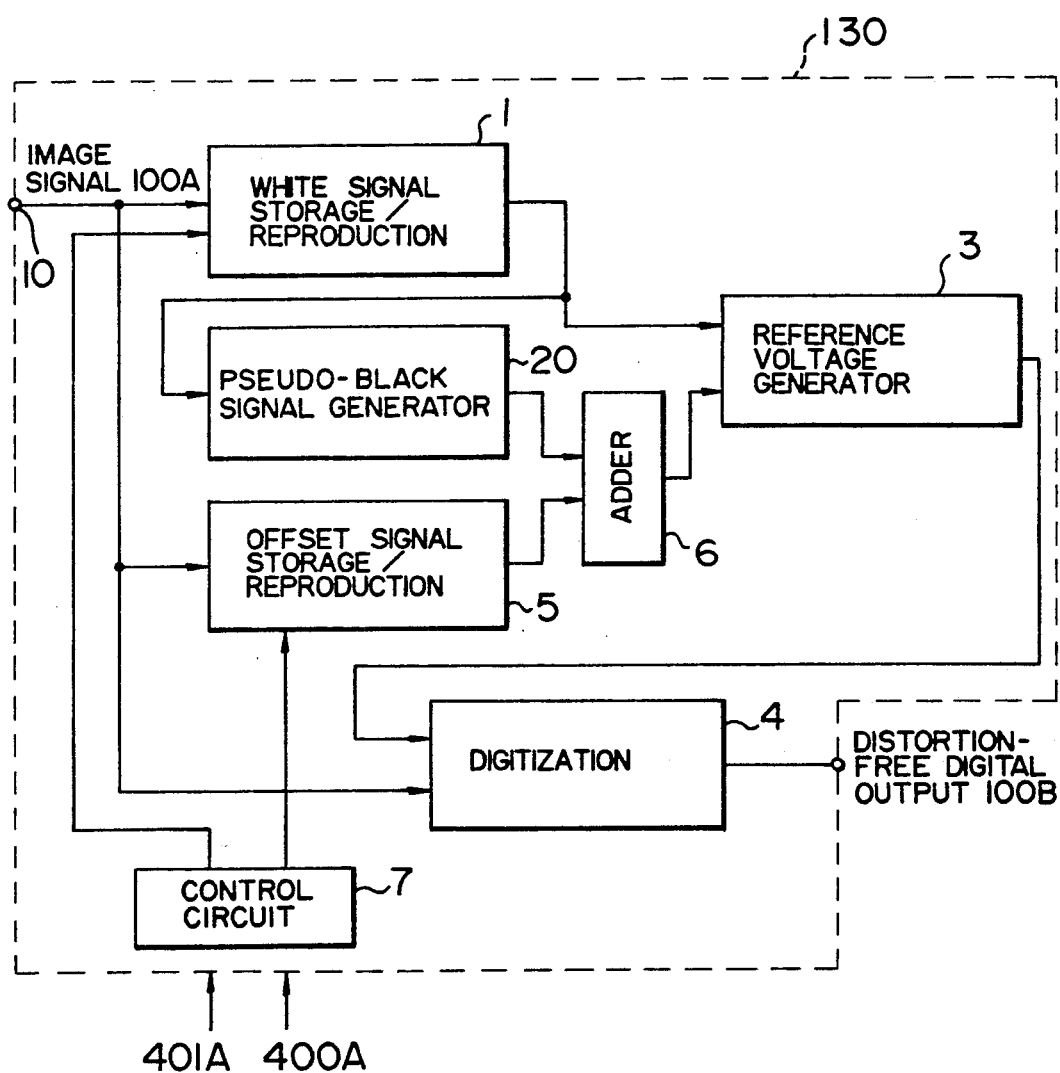
FIG. 12 is a block diagram showing the structure of still another embodiment of the present invention.

Still another preferred embodiment of the present invention will now be described with reference to FIGS. 12 and 13. FIG. 12 is a block diagram showing the structure of the third embodiment of the image signal correcting apparatus which is generally designated by the reference numeral 130.

This third embodiment is a modification of the second embodiment shown in FIG. 9 in that an offset signal storage/reproduction circuit 5 and an adder circuit 6 are additionally provided. That is, the offset signal storage/reproduction circuit 5 is connected at its input to the image signal input source 10, and the adder circuit 6 is connected at its inputs to the output of the offset signal storage/reproduction circuit 5 and to the output of the pseudo-black signal generator circuit 20 respectively. The adder circuit 6 is connected at its output to the other input of the reference voltage generator circuit 3. As in the case of the white signal storage/reproduction circuit 1 and the black signal storage/reproduction circuit 2 shown in FIG. 7, the offset signal storage/reproduction circuit 5 includes an A/D converter, a memory circuit and a D/A converter. Because the offset signal will not change so appreciably, the number of bits to be A/D converted, stored and D/A converted will be less than that in the white signal storage/reproduction circuit 1. Further, because sensor signal output causing a scattered offset changes stepwise, the amount of offset data to be stored will not be large, and a large storage capacity will not be required for the memory circuit.

This third embodiment of the image signal correcting apparatus generally designated by the reference numeral 130 is designed so as to correct an image signal distortion or shading attributable to an offset output of the image sensor. First, an offset signal representing a shading distortion occurring when the light sources directing light toward the image sensor are de-energized, is applied from the image signal input source 10 to be stored in the offset signal storage/ reproduction circuit 5. Then, as in the case of the second embodiment described above, a white signal is applied to the white signal storage/reproduction circuit 1 to be stored and reproduced, and the reproduced white signal is applied to the pseudo-black signal storage/ reproduction circuit 20 which applies a reproduced pseudo-black signal to the adder circuit 6. Because the pseudo-black signal is produced by voltage division of the white signal, its offset component is reduced as shown in FIG. 13. This pseudo-black signal is added in the adder circuit 6 to the offset signal reproduced from the offset signal storage/reproduction circuit 5, so that the shading distortion represented by the offset signal is reproduced, as shown by the waveform of the resultant output signal from the adder circuit 6 in FIG. 13. This output signal of the adder circuit 6 is applied, as a black reference signal, to the reference voltage generator circuit 3. In the reference voltage generator circuit 3, the black signal and the white signal are subjected to voltage division to appear as a reference voltage, and this reference voltage is applied together with the image signal 100A to the digitization circuit 4. In the digitization circuit 4, processing similar to that described already is carried out, so that a pseudo distortion-free digital output signal 100B appears from the digitization circuit 4.

According to this third embodiment too, an analog image signal, in which both a white signal and a black signal have a shading distortion, can be accurately corrected and converted into a distortion-free digital signal in spite of the fact that the correction/digitization circuit has a small circuit scale. Because the shading distortion can be corrected by the correction/ digitization circuit having the small circuit scale, the present invention provides an image signal correcting apparatus which is inexpensive and suitable to be integrated into an LSI.

In each of the aforementioned embodiments, the individual circuits in the image signal correcting apparatus can be integrated into an integrated circuit. Therefore, as shown by the broken lines in FIG. 6, the image sensor 300, with which the image signal correcting apparatus 100 (110, 120 or 130) integrated into an LSI is combined, can be handled as an assembly part.

It will be understood from the foregoing detailed description of the present invention that a distorted white signal obtained by reading a white document and a distorted black signal obtained by reading a black document are subjected to voltage division to produce a reference voltage, and a document image signal obtained by reading a document is compared with the reference voltage so as to produce a distortion-free digital image output signal. Therefore, the distorted white signal and the distorted black signal can be corrected by an image signal correction/digitization circuit of small circuit scale, and a satisfactorily shading-free image signal can be obtained.

I claim:

1. A method for correcting an image signal generated from a direct contact type image sensor which reads an image of a pattern on a document and converts the image into a digital signal, comprising the steps of:
   storing a white signal which is an image signal corresponding to a white document;
   producing, on the basis of said stored white signal, a pseudo-black signal which is proportional to said white signal and is an image signal corresponding to a black document;
   producing a reference voltage by dividing a voltage range between said stored white signal and said pseudo-black signal according to a predetermined ratio; and
   comparing an image signal generated from said image sensor with said reference voltage thereby generating a distortion-free digital signal.

2. An image signal correcting method according to claim 1, further comprising the step of storing an offset signal representing a shading distortion appearing in the image signal generated from said image sensor when a light source emitting light irradiating said document is deenergized, wherein said offset signal is added to said pseudo-black signal so as to produce said reference voltage.

3. A method for correcting an image signal generated from a direct contact type image sensor which reads an image of a pattern on a document and converts the image into a digital signal, comprising the steps of:
   storing a white signal which is an image signal corresponding to a white document;
   producing, on the basis of said stored white signal, a reference voltage including a component of a black signal which is proportional to said stored white signal and is an image signal corresponding to a black document; and
   comparing an image signal generated from said image sensor with said reference voltage thereby generating a distortion-free digital signal.

4. A method for correcting an image signal generated from a direct contact type image sensor which reads an image of a pattern on a document so as to generate a corresponding digital signal, comprising
   means for storing and reproducing a white signal which is an image signal corresponding to a white document;
   means for producing, on the basis of said stored white signal, a pseudo-black signal which is proportional to said stored white signal and is an image signal corresponding to a black document; and
   a reference voltage generator circuit for dividing a voltage range between said stored white signal and said pseudo-black signal according to a predetermined ratio thereby producing a reference voltage;
   a digitization circuit connected to said reference voltage generator circuit, for comparing an image signal generated from said image sensor with said reference voltage, thereby generating a distortion-free digital signal; and
   a control circuit for controlling the operation sequence and timing of said white signal storing and reproducing means.

5. An image signal correcting apparatus according to claim 4, wherein said image signal correcting apparatus is integrated into an integrated circuit.

6. An image signal correcting apparatus according to claim 4, further comprising:
   means for storing and reproducing an offset signal representing a shading distortion appearing in the image signal generated from said image sensor when a light source emitting light irradiating said document is deenergized; and adder, means, connected to said offset signal storing and reproducing means, said pseudo-black signal producing means and said reference voltage generator circuit, for adding said offset signal to said pseudo-black signal and supplying the resultant output signal to said reference voltage generator circuit.

7. An image signal correcting apparatus according to claim 6, wherein said image signal correcting apparatus is integrated into an integrated circuit.

8. A method for correcting an image signal generated from a direct contact type image sensor which reads an image of a pattern on a document so as to generate a corresponding digital signal, comprising
   means for storing and reproducing a white signal which is an image signal corresponding to a white document;
   a reference voltage generator circuit for generating on the basis of said stored white signal, a reference voltage including a component of a black signal which is proportional to said stored white signal and is an image signal corresponding to a black document;
   a digitization circuit connected to said reference voltage generator circuit, for comparing an image signal generated from said image sensor with said reference voltage, thereby generating a distortion-free digital signal; and
   a control circuit for controlling the operation sequence and timing of said white signal storing and reproducing means.

9. An image signal correcting apparatus according to claim 8, wherein said image signal correcting apparatus is integrated into an integrated circuit.

10. A direct contact type image sensor assembly provided with an image signal correcting function, comprising:
    an image sensor for reading an image of a pattern on a document, thereby generating an image signal; and
    an image signal correcting apparatus including:
    means for storing and reproducing a white signal which is an image signal corresponding to a white document;
    means for producing, on the basis of said stored white signal, a pseudo-black signal which is proportional to said stored white signal and is an image signal corresponding to a black document;
    a reference voltage generator circuit for dividing a voltage range between said stored white signal and said pseudo-black signal according to a predetermined ratio thereby producing a reference voltage;
    a digitization circuit connected to said reference voltage generator circuit, for comparing an image signal generated from said image sensor with said reference voltage, thereby generating a distortion-free digital signal; and a control circuit for controlling the operation sequence and timing of said white signal storing and reproducing means.

11. A direct contact type image sensor assembly provided with an image signal correcting function, comprising:

an image sensor for reading an image of a pattern on a document, thereby generating an image signal; and an image signal correcting apparatus including:

means for storing and reproducing a white signal which is an image signal corresponding to a white document;

a reference voltage generator circuit for generating, on the basis of said stored white signal, a reference voltage including a component of a black signal which is proportional to said stored white signal and is an image signal corresponding to a black document;

a digitization circuit connected to said reference voltage generator circuit, for comparing an image signal generated from said image sensor with said reference voltage, thereby generating a distortion-free digital signal; and a control circuit for controlling the operation sequence and timing of said white signal storing and reproducing means.

* * * * *